(12) United States Patent
O'Hare et al.

(10) Patent No.: US 10,040,695 B2
(45) Date of Patent: Aug. 7, 2018

(54) HIGH SURFACE AREA LAYERED DOUBLE HYDROXIDES

(71) Applicant: SCG Chemicals Co., Ltd., Bangkok (TH)

(72) Inventors: Dermot O'Hare, Oxford (GB); Chunping Chen, Oxford (GB); Aunchana Wangriya, Bangkok (TH); Anchalee Wangariyakawee, Bangkok (TH); Qiang Wang, Beijing (CN)

(73) Assignee: SCG Chemicals Co., Ltd., Bangkok (TH)

( * ) Notice: Subject to any disclaimer, the term of this patent is extended or adjusted under 35 U.S.C. 154(b) by 0 days.

(21) Appl. No.: 15/129,137

(22) PCT Filed: Mar. 25, 2015

(86) PCT No.: PCT/EP2015/056444
§ 371 (c)(1),
(2) Date: Sep. 26, 2016

(87) PCT Pub. No.: WO2015/144778
PCT Pub. Date: Oct. 1, 2015

(65) Prior Publication Data
US 2017/0107116 A1 Apr. 20, 2017

(30) Foreign Application Priority Data
Mar. 27, 2014 (GB) .................................. 1405543.8

(51) Int. Cl.
*B01J 20/08* (2006.01)
*B01J 21/10* (2006.01)
(Continued)

(52) U.S. Cl.
CPC ............. *C01F 11/18* (2013.01); *B01J 20/041* (2013.01); *B01J 20/043* (2013.01); *B01J 20/045* (2013.01);
(Continued)

(58) Field of Classification Search
CPC .. C01F 11/18; B01J 20/04; B01J 20/08; B01J 20/22; B01J 20/28; B01J 20/30;
(Continued)

(56) References Cited

U.S. PATENT DOCUMENTS 6,387,033 B1 5/2002 Choudary et al.
6,852,670 B1 2/2005 Ogawa et al.
(Continued)

FOREIGN PATENT DOCUMENTS

CN 101084066 A 12/2007
CN 103 159 238 A 6/2013
(Continued)

OTHER PUBLICATIONS

Chen, Chunping, et al., "Synthesis and characterisation of aqueous miscible organic-layered double hydroxides," Journal of Materials Chemistry A, 2(36): 15102 (Aug. 7, 2014).
(Continued)

*Primary Examiner* — Daniel C McCracken
(74) *Attorney, Agent, or Firm* — David P. Halstead; Foley Hoag LLP

(57) ABSTRACT

Layered double hydroxides having a high surface area (at least 125 m²/g) and the formula (I)

Figure 1:
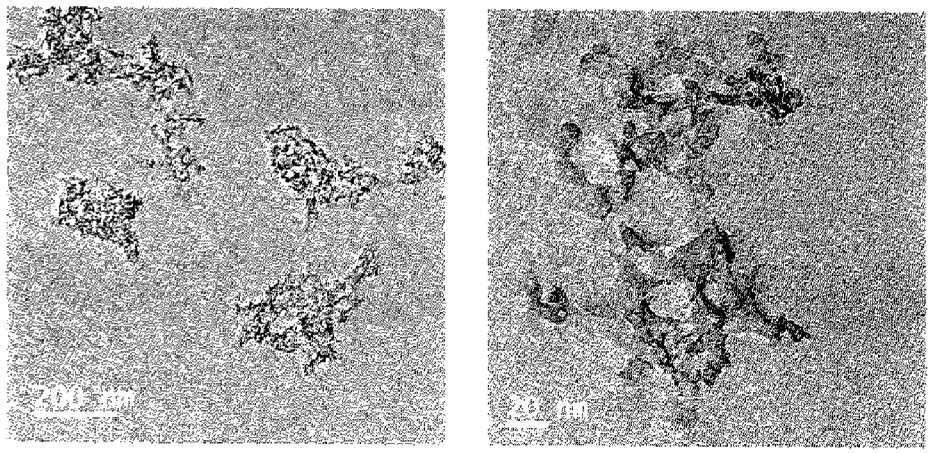

$$[M^{z+}_{1-x}M'^{y+}_{x}(OH)_2]^{a+}(X^{n-})_{a/n} \cdot bH_2O \cdot c(\text{AMO-solvent}) \qquad (I)$$

wherein M and M' are different and each is a charged metal cation (and must be present), z=1 or 2; y=3 or 4, 0<x<0.9, b is 0 to 10, c=0 to 10, X is an anion, n is the charge on the
(Continued)

anion, and a=z(1−x)+xy−2; AMO-solvent is aqueous miscible organic solvent, may be prepared by a method which comprises a) precipitating a layered double hydroxide having the formula

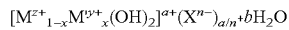
$[M^{z+}_{1-x}M'^{y+}_{x}(OH)_2]^{a+}(X^{n-})_{a/n} \cdot bH_2O$ wherein M, M', z, y, x, a, b and X are as defined above from a solution containing the cations of the metals M and M' and the anion $X^{n-}$;

b) ageing the layered double hydroxide precipitate obtained in step a) in the original solution;
c) collecting, then washing the layered double hydroxide precipitate;
d) dispersing the wet layered double hydroxide in an AMO solvent so as to produce a slurry of the layered double hydroxide in the solvent;
e) maintaining the dispersion obtained in step d); and
f) recovering and drying the layered double hydroxide.

The high surface area products have low particle size and are particularly suitable for use as catalysts, catalyst supports, sorbents and coatings.

20 Claims, 10 Drawing Sheets

(51) Int. Cl.
| B01J 23/06 | (2006.01) |
| B01J 37/08 | (2006.01) |
| B01J 27/138 | (2006.01) |
| B01J 27/053 | (2006.01) |
| B01J 27/232 | (2006.01) |
| B01J 37/04 | (2006.01) |
| B01J 20/30 | (2006.01) |
| B01J 27/25 | (2006.01) |
| C01F 11/18 | (2006.01) |
| B01J 27/236 | (2006.01) |
| B01J 31/26 | (2006.01) |
| B01J 31/28 | (2006.01) |
| B01J 31/02 | (2006.01) |
| B01J 35/10 | (2006.01) |
| B01J 35/02 | (2006.01) |
| B01J 37/03 | (2006.01) |
| B01J 37/02 | (2006.01) |
| B01J 20/22 | (2006.01) |
| B01J 20/04 | (2006.01) |
| B01J 20/28 | (2006.01) |
| C09D 1/00 | (2006.01) |
| C01F 11/46 | (2006.01) |
| C01F 11/36 | (2006.01) |
| C01G 53/00 | (2006.01) |
| C01G 51/00 | (2006.01) |
| C01G 3/00 | (2006.01) |

(52) U.S. Cl.
CPC ............... *B01J 20/08* (2013.01); *B01J 20/22* (2013.01); *B01J 20/28016* (2013.01); *B01J 20/28061* (2013.01); *B01J 20/3085* (2013.01); *B01J 27/053* (2013.01); *B01J 27/236* (2013.01); *B01J 27/25* (2013.01); *B01J 31/0208* (2013.01); *B01J 31/26* (2013.01); *B01J 31/28* (2013.01); *B01J 35/026* (2013.01); *B01J 35/1019* (2013.01); *B01J 37/0236* (2013.01); *B01J 37/031* (2013.01); *C01F 11/36* (2013.01); *C01F 11/46* (2013.01); *C01G 3/006* (2013.01); *C01G 51/006* (2013.01); *C01G 53/006* (2013.01); *C09D 1/00* (2013.01); *C01P 2002/22* (2013.01); *C01P 2004/61* (2013.01); *C01P 2006/12* (2013.01)

(58) Field of Classification Search
CPC ........ B01J 27/053; B01J 27/236; B01J 27/25; B01J 31/02; B01J 31/26; B01J 31/28
See application file for complete search history.

(56) References Cited

U.S. PATENT DOCUMENTS

| 9,382,123 B2 | 7/2016 | O'Hare et al. |
| 2009/0267024 A1 | 10/2009 | Ono |

FOREIGN PATENT DOCUMENTS

| EP | 0794152 A2 | 9/1997 |
| JP | H06191854 A | 7/1994 |
| JP | 2005060164 A | 3/2005 |
| WO | WO-2007065877 A1 | 6/2007 |
| WO | WO-2011/124931 A1 | 10/2011 |
| WO | WO-2014/051530 A2 | 4/2014 |

OTHER PUBLICATIONS

Wang, Qiang, et al., "Large-scale synthesis of highly dispersed layered double hydroxide powders containing delaminated single layer nanosheets," Chemical Communications, 49(56): 6301 (Jun. 5, 2013).
International Search Report for PCT/EP2015/056444 dated Aug. 14, 2015.
Behera et al., "Low temperature synthesis of spherical lanthanum aluminate nanoparticles," Mater Lett, 58(29):3710-3715 (2004).
Carja et al., "The role of the organic solvent in obtaining hydrotalcite—like anionic clay nanopowders with specific textural and porous properties," COFrRoCA 2006, pp. 157-162 (2006).
Li et al., "Preparation of poly (methyl methacrylate)/LDH nanocomposite by exfoliation-adsorption process," Colloid Polym Sci, 281(10):998-1001 (2003).
Lohe et al., "Heating and separation using nanomagnet-functionalized metal-organic frameworks," Chem Commun, 47:3075-3077 (2011).
Song et al., "Self-assembled hierarchical porous layered double hydroxides by solvothermal method and their application for capacitors," Micropor Mesopor Mat, 148(1):159-165 (2012).
Wang et al., "Electronic Supporting Information: Large-scale synthesis of highly dispersed layered double hydroxide powders containing delaminated single layer nanosheets," pp. 1-18 (2013).
Williams et al., "Staging during anion-exchange intercalation into [LiAl2(OH)6]Cl-yH2O: structural and mechanistic insights," Dalton T, 32:3499-3506 (2007).
Chen et al., "Tuneable ultra high specific surface area Mg/Al—CO3 layered double hydroxides," Dalton T, 44(37):16392-16398 (2015).
International Search Report and Written Opinion for International Application No. PCT/TH2013/000052 dated Apr. 4, 2014.
Khan et al., "Recent developments in the use of layered double hydroxides as host materials for the storage and triggered release of functional anions," Ind Eng Chem Res, 48(23):10196-10205 (2009).
Meyn et al., "Anion-exchange reactions of layered double hydroxides," Inorg Chem, 29(26):5201-5207 (1990).
Notice of Allowance and Fees Due for U.S. Appl. No. 14/432,019 dated Feb. 2, 2018.
Yang et al., "Synthesis and characterisation of layered double hydroxide dispersions in organic solvents," RSC Adv, 4(93):51676-51682 (2014).

HIGH SURFACE AREA LAYERED DOUBLE HYDROXIDES

RELATED APPLICATIONS

This application is a § 371 national stage application based on Patent Cooperation Treaty Application serial number PCT/EP2015/056444, filed Mar. 25, 2015, which claims the benefit of priority to GB 1405543.8, filed Mar. 27, 2014.

The present invention relates to high surface area layered double hydroxides (LDHs) and to methods of making them.

Layered double hydroxides (LDHs) are a class of compounds which comprise two metal cations and have a layered structure. A review of LDHs is provided in *Structure and Bonding*; Vol 119, 2005 *Layered Double Hydroxides* ed. X Duan and D. G. Evans. The hydrotalcites, perhaps the most well-known examples of LDHs, have been studied for many years. LDHs can intercalate anions between the layers of the structure. WO 99/24139 discloses use of LDHs to separate anions including aromatic and aliphatic anions.

Owing to the relatively high surface charge and hydrophilic properties of LDHs, the particles or crystallites of conventionally synthesised LDHs are generally highly aggregated. The result of this is that, when produced, LDHs aggregate to form "stone-like", non-porous bodies with large particle sizes of up to several hundred microns and low specific surface area of generally 5 to 15 $m^2/g$ (as disclosed for example in Wang at al *Catal. Today* 2011, 164, 198). Reports by e.g. Adachi-Pagano at al (*Chem. Common.* 2000, 91) of relatively high surface area LDHs have specific surface areas no higher than 5 to 120 $m^2/g$.

In certain applications (for example adsorbents or catalyst supports), it would also be advantageous to provide LDHs with higher surface areas than currently known. Relatively high surface areas would lead to a greater number of active sites and facilitate mass transport from the surface to bulk.

We have found that high surface area LDHs can be prepared by a simple method in a cost effective way involving fewer operational steps and using smaller quantities of organic solvents compared to other known methods. This simple method will be more amenable to large scale production than previous known methods.

Accordingly, the present invention provides a method of preparing a layered double hydroxide having a specific surface area of at least 125 $m^2/g$ and having the formula:

$$[M^{z+}_{1-x}M'^{y+}_{x}(OH)_2]^{a+}(X^{n-})_{a/n} \cdot bH_2O \cdot c(\text{AMO-solvent}) \quad (I)$$

wherein M and M' are different and each is a charged metal cation (and must be present), z=1 or 2; y=3 or 4, 0<x<0.9, b is 0 to 10, c=0 to 10, X is an anion, n is the charge on the anion, and a=z(1−x)+xy−2; AMO-solvent is aqueous miscible organic solvent,
which method comprises
a) precipitating a layered double hydroxide having the formula

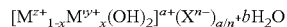

wherein M, M', z, y, x, a, b and X are as defined above from a solution containing the cations of the metals M and M' and the anion $X^{n-}$;
b) aging the layered double hydroxide precipitate obtained in step a) in the original solution;
c) collecting, then washing the layered double hydroxide precipitate;
d) dispersing the wet layered double hydroxide in an AMO solvent so as to produce a slurry of the layered double hydroxide in the solvent;
e) maintaining the dispersion obtained in step d); and
f) recovering and drying the layered double hydroxide.

In step a) of the method of the invention, the layered double hydroxide will typically be produced by adding an aqueous precursor solution containing ions of the metals M and M' into a solution containing the anion X which may additionally contain NaOH or to which NaOH solution may be added separately in order to adjust the pH of the solution to a predetermined value, typically greater than 7, preferably greater than 9, more preferably 10-12. It is, according to a preferred embodiment, desirable to add the metal precursor solution to the anion solution rapidly with vigorous stirring since this promotes rapid nucleation of the LDH. We have found that this rapid addition and quick co-precipitation stage causes the LDH colloid formed to have a smaller and thinner particle size. The LDH is subjected to ageing in the original reaction solution and, preferably, the solution containing the precipitated LDH will be aged for less than 24 hours, preferably less than 16 hours and more preferably less than 3 hours. In step c) of the method, the precipitated layered double hydroxide is collected and then washed. Typically, the precipitate is collected by filtration. After collection, the precipitate is washed until the washing solution has a pH which is substantially neutral, for example pH 7±0.5. Washing is typically carried out using deionised water. Preferably, after water washing, the precipitated LDH is rinsed with the AMO-solvent.

According to the method of the invention, the collected and washed LDH is re-dispersed in the AMO-solvent so as to produce a slurry of the LDH in the solvent. The AMO-solvent is one that is miscible with water. Preferably, the AMO-solvent has a solvent polarity (P) in the range of from 3.8 to 9. Solvent polarity (P) is defined based on experimental solubility data reported by Snyder and Kirkland (Snyder, L. R.; Kirkland, J. J. in *Introduction to modern liquid chromatography*, $2^{nd}$ ed.; John Wiley and Sons: New York, 1979; pp 248-250). Generally, any suitable organic solvent may be used but preferably will be one selected from acetone, acetonitrile, dimethylformamide, dimethyl sulphoxide, dioxane, ethanol, methanol, n-propanol, isopropanol or tetrahydrofuran. According to a particularly preferred embodiment, the organic solvent is acetone. The AMO-solvent comprised in the layered double hydroxide of formula (I) may be the same or different as the AMO-solvent used in the dispersing step.

The dispersion of LDH in the organic solvent is maintained preferably for at least three hours. It is preferred that the dispersion is maintained under agitation and/or stirring. Stirring can be carried out using a magnetic stirrer at a stirring speed which is preferably at least 300 rpm and more preferably at least 1000 rpm. A propeller mixer having a peripheral speed of at least 0.5 m/s may, alternatively, be used. This ageing process is essential for obtaining an LDH having high surface area. We have found that the surface area of the final product is dependent on the length of time the dispersion of the LDH in the organic solvent is aged. Preferably, the slurry of LDH in the organic solvent is aged for up to 96 hours, for instance for a period of from 1 to 4 days. More preferably, the ageing period will be in the range of from 1 to 3 days since we have found that the increase in surface area of the LDH that occurs during ageing after the first 72 hours of ageing is not significant. Typically, the dispersion of LDH in the organic solvent will be aged for from 48 to 72 hours. We have, further, found that it is beneficial to the final product if, after the dispersion of LDH in organic solvent has been subjected to ageing, the organic solvent is removed and the LDH is re-dispersed in fresh

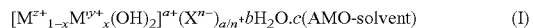

organic solvent. When this re-dispersion of the LDH is carried out, the fresh dispersion of the LDH in fresh organic solvent may be maintained for up to 2 hours.

The aged dispersion of the LDH in organic solvent or, if the LDH has been re-dispersed in fresh organic solvent, the re-dispersion is then subjected to a procedure whereby the LDH may be recovered and dried. We have found that the specific surface area of the final dried product depends on the drying procedure used.

According to one preferred embodiment, the step d) of recovering and drying the LDH comprises filtering the LDH from the organic solvent and then subjecting the collected LDH to drying. Drying may be carried out in an oven, with or without applied vacuum. Typically, oven drying will be carried out at a relatively low temperature which will be dependent on the temperature at which the organic solvent evaporates. Preferably, the drying step, when the AMO solvent is acetone, will be carried out at a temperature in the range of room temperature (20° C.) to 60° C. In the preferred embodiment according to which acetone is used as the organic solvent, we have found that an oven temperature of about 60° C. may be used to dry the collected LDH. We have found that whereas a product dried overnight in an oven at 60° C. has a specific surface area of about 142 m$^2$/g, a similar product dried overnight in an open vessel in a vacuum oven has a specific surface area of 180 m$^2$/g or greater.

According to a different preferred embodiment, the step d) of the method comprises passing the dispersion of LDH in the organic solvent to a spray drying apparatus and then spray drying the dispersion, typically using an inert atmosphere such as nitrogen, so as to produce a spray dried LDH. We have found that by using a spray drying procedure to obtain a dry LDH product from the dispersion in AMO-solvent, the final LDH has a significantly increased surface area compared to an LDH product obtained by filtering and then oven drying the filtered material. Furthermore, it appears from the results we have obtained that the specific surface area of the final LDH obtained is dependent on the feed rate of the dispersion to the spray dryer and on the inlet and outlet temperatures at the spray dryer. In the Examples provided, it is demonstrated that an LDH dispersion in acetone (aged for only one hour), spray dried using a feed rate in a range of 10-15 ml/min, an inlet temperature of 87° C. and an outlet temperature of 58° C., gives a final spray dried product having a specific surface area of about 316 m$^2$/g whereas the same dispersion spray dried using a feed rate in a range of 20-25 ml/min, an inlet temperature of 95° C. and an outlet temperature of 57° C. gives a final spray dried product having a specific surface area of about 333 m$^2$/g. Thus, according to a preferred embodiment, the LDH dispersion in the AMO-solvent is fed into the spray dryer at a feed rate of at least 12 ml/min, more preferably at least 18 ml/min and most preferably about 24 ml/min.

In the formula (I) given for the LDH, M may be a single metal cation or a mixture of different metal cations. For example, when z is 2, M may be selected from Mg, Ca or Zn, or transition metal cations such as Fe, Ni, Co, Mn or Cu, and when z is 1, M may be Li. Preferred M are Mg, Zn, Fe, Ca, Ni, Co, Mn, Cu or a mixture of two or more of these.

M' may be a single metal cation or a mixture of different metal cations. For example, when y=3, M' may be selected from Al, Ga, Y, In, Fe, Co, Ni, Mn, Cr, Ti, V or La, and when y=4, M' may be selected from Sn, Ti or Zr or a mixture thereof. The preferred M' is Al. The preferred value of y is 3.

Preferably, z is 2 and M is Ca or Mg or Zn or Fe.

The preferred LDHs are Mg/Al, Ca/Al, Ni/Al, Cu/Al or Zn/Al.

Preferred values of x are 0.2 to 1, preferably 0.22 to 0.5, more preferably 0.23 to 0.4.

The anion in the LDH may be any appropriate anion organic or inorganic, for example halide (e.g., chloride), inorganic oxyanions (e.g. $X_mO_n(OH)_p^{-q}$; m=1-5; n=2-10; p=0-4, q=1-5; X=B, C, N, S, P: e.g. carbonate, bicarbonate, hydrogenphosphate, dihydrogenphosphate, nitrite, borate, nitrate, phosphate, sulphate), anionic surfactants (such as sodium dodecyl sulfate, fatty acid salts or sodium stearate), anionic chromophores, and/or anionic UV absorbers, for example 4-hydroxy-3-10 methoxybenzoic acid, 2-hydroxy-4 methoxybenzophenone-5-sulfonic acid (HMBA), 4-hydroxy-3-methoxy-cinnamic acid, p-aminobenzoic acid and/or urocanic acid.

According to one embodiment of the invention, the value of c is greater than zero. The following Examples demonstrate the preparation of LDH compounds wherein c is 0.1.

The present invention further relates to a layered double hydroxide A prepared by a method comprising a) precipitating a layered double hydroxide B having the formula

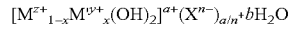

wherein M and are different and each is a charged metal cation, z=1 or 2; y=3 or 4; 0<x<0.9, b is 0 to 10, X is an anion, n is the charge on the anion, and a=z(1−x)+xy−2; from a solution containing the cations of the metals M and M' and the anion $X^{n-}$.

b) ageing the layered double hydroxide precipitate obtained in step a) in the original solution;

c) collecting, then washing the layered double hydroxide precipitate;

d) dispersing the wet layered double hydroxide in an AMO-solvent so as to produce a slurry of the layered double hydroxide in the solvent;

e) maintaining the dispersion in step d); and f) recovering and drying the layered double hydroxide A; wherein the layered double hydroxide A has a specific surface area of at least 125 m$^2$/g.

Preferably, when z is 2, M is Mg, Zn, Fe, Ca, Sn, Ni, Cu, Co, Mn or Cd or a mixture of two or more of these, or when z is 1, M is Li. Preferably, when y is 3, M' is Al, Ga, Y, In, Fe, Co, Ni, Mn, Cr, Ti, V, or La, or when y is 4, M is Sn, Ti or Zr or a mixture thereof.

According to a preferred embodiment, M' is Al. The layered double hydroxide A will especially be one selected from Zn/Al, Mg/Al, and Ca/Al, Ni/Al, Cu/Al. Most preferably, the layered double hydroxide is an Mg/Al layered double hydroxide.

Typically, X is an anion selected from at least one of halide, inorganic oxyanion, anionic surfactants, anionic chromophores, and anionic UV absorbers. Examples of inorganic oxyanion include carbonate, bicarbonate, hydrogenphosphate, dihydrogenphosphate, nitrite, borate, nitrate, sulphate or phosphate or a mixture or two or more thereof.

The layered double hydroxide A of the invention has a specific surface area of at least 125 m$^2$/g, preferably at least 240 m$^2$/g.

The layered double hydroxide A of the invention preferably has a BET pore volume (N$_2$) of at least 0.5 cc/g, more preferably at least 1.0 cc/g.

The layered double hydroxide A of the invention preferably has a particle size less than 150 μm, more preferably a particle size less than 30 μm.

When the layered double hydroxide A is dried by spray drying in step f), it typically has an agglomerated particle size less than 100 μm, preferably less than 30 μm.

According to a different aspect, the present invention provides a Mg—Al—$CO_3$ layered double hydroxide having a specific surface area of at least 300 m$^2$/g, preferably at least 314 m$^2$/g, more preferably at least 330 m$^2$/g.

The materials according to the invention are particularly suitable to be used for a large variety of applications, for instance as catalysts, catalyst supports, sorbents and coatings.

In the following Examples, the characterization methods used were:

X-Ray diffraction (XRD)—XRD patterns were recorded on a PANalytical X'Pert Pro instrument in reflection mode with Cu Kα radiation. The accelerating voltage was set at 40 kV with 40 mA current (λ=1.542°) at 0.01° s$^{-1}$ from 1° to 70° with a slit size of ¼ degree.

Transmission Electron Microscopy (TEM)—TEM analysis was performed on JEOL 2100 microscope with an accelerating voltage of 400 kV. Samples were dispersed in ethanol with sonication and then cast onto copper TEM grids coated with lacey carbon film.

Scanning Electron Microscopy (SEM)—SEM analyses were performed on a JEOL JSM 6100 scanning microscope with an accelerating voltage of 20 kV. Powder samples were spread on carbon tape adhered to an SEM stage. Before observation, the samples were sputter coated with a thick Platinum layer to prevent charging and to improve the image quality.

BET Specific Surface Areas—BET specific surface areas were measured from the $N_2$ adsorption and desorption isotherms at 77 K collected from a Quantachrome Autosorb-6B surface area and pore size analyser. Before each measurement, LDH samples were first degassed overnight at 110° C.

ThermoGravimetric Analysis—TGA's was carried out using a Perkin Elmer TGA7 Thermogravametric Analyser. Approximately 10 mg of sample was heated in a platinum pan in the furnace. Initially the temperature was held at 30° C. for 5 minutes and then was increased to 800° C. at a rate of 5° C. per minute. The sample was held at 800° C. for five minutes. These data were used to determine both the thermal stability and the $H_2O$ and AMO solvent content of the materials. Small variations in the $H_2O$ and acetone content was observed on repeat measurements.

Figure 2:
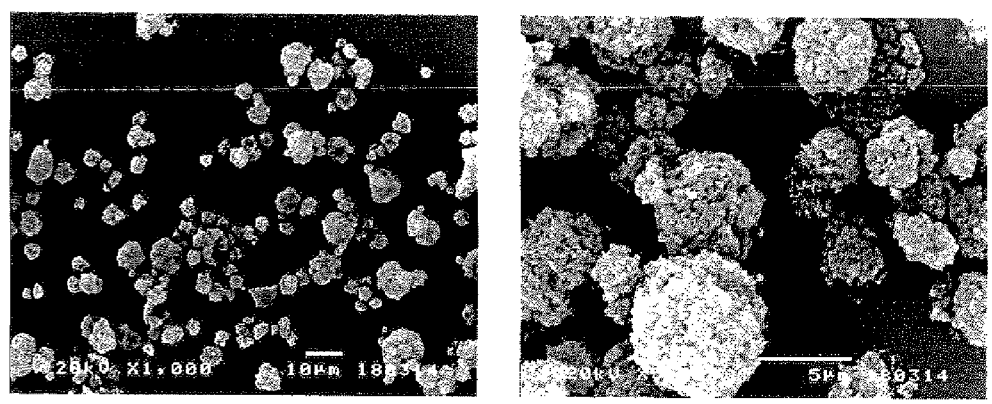

Further advantages and features of the subject-matter of the present invention can be taken from the following detailed description taking in conjunction with the drawing, in which:

FIG. 1: TEM images of $Mg_3Al$—$CO_3$ LDHs obtained from Example 1 before drying FIG. 2: SEM images of $Mg_3Al$—$CO_3$ LDHs obtained from Example 1 after spray drying FIG. 3: XRD pattern of $Mg_3Al$—$CO_3$ LDHs obtained from Example 1 before drying a) only washed with water, b) dispersed in acetone for 48 hr.

Figure 4:
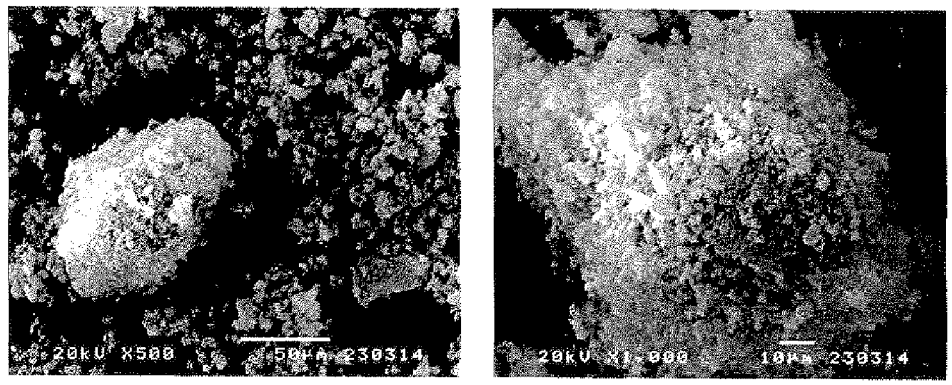
Figure 5:
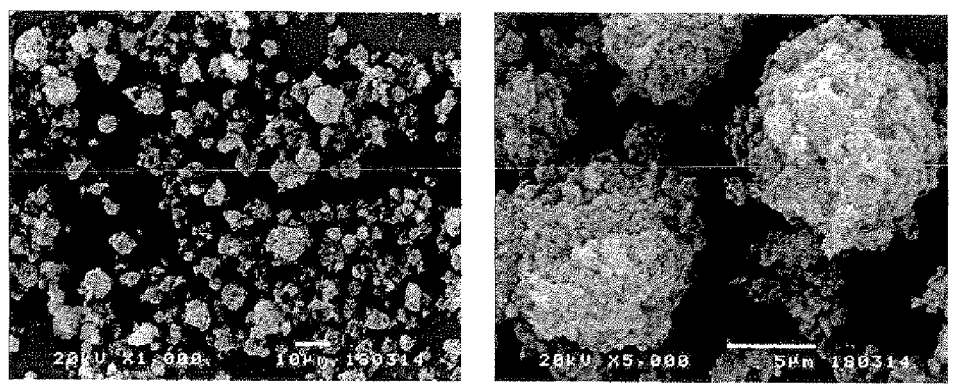
Figure 6:
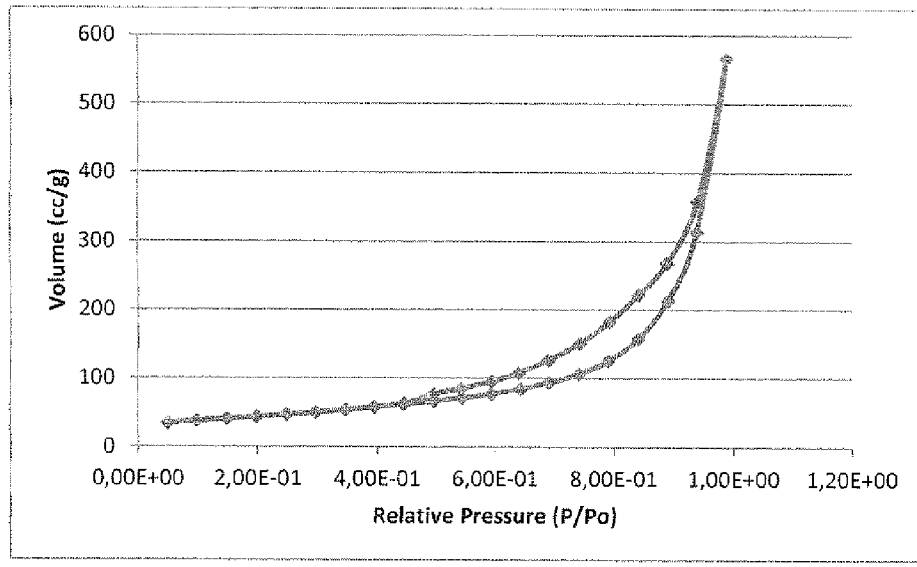
Figure 7:
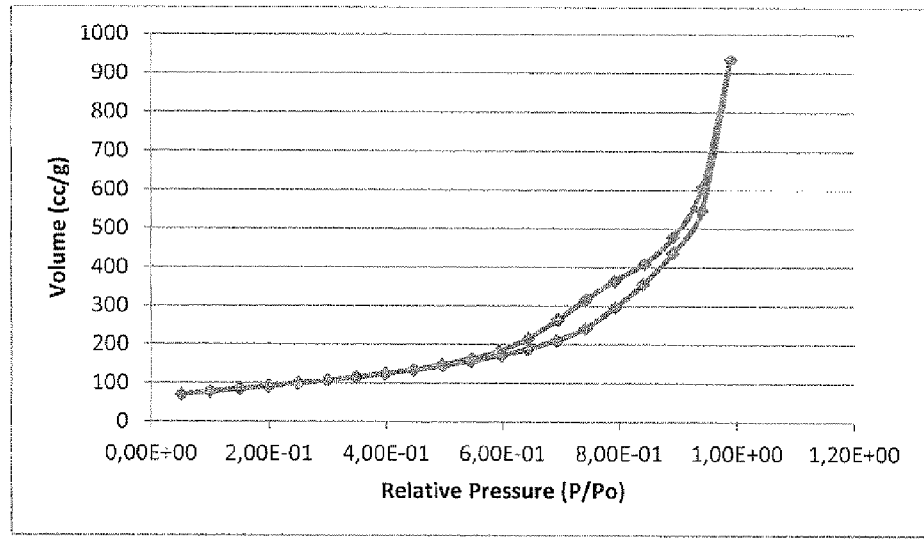
Figure 8:
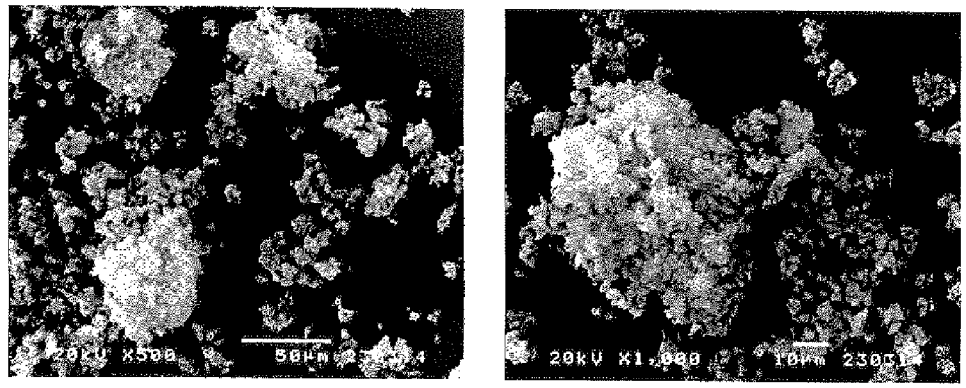
Figure 9:
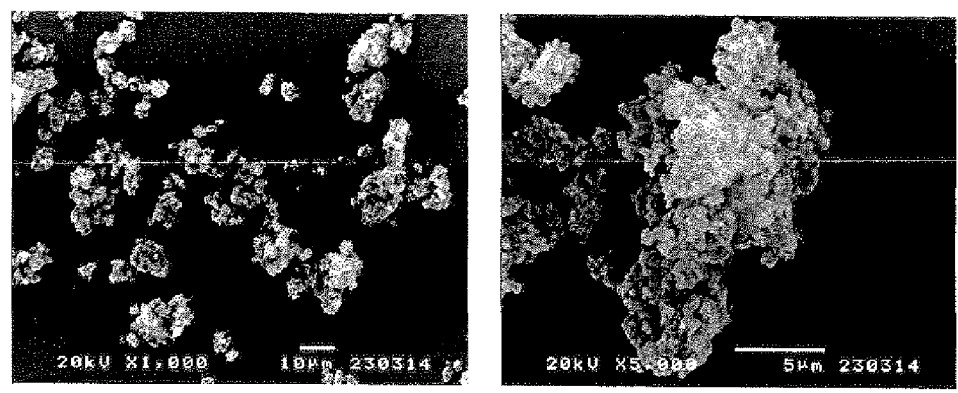
Figure 10:
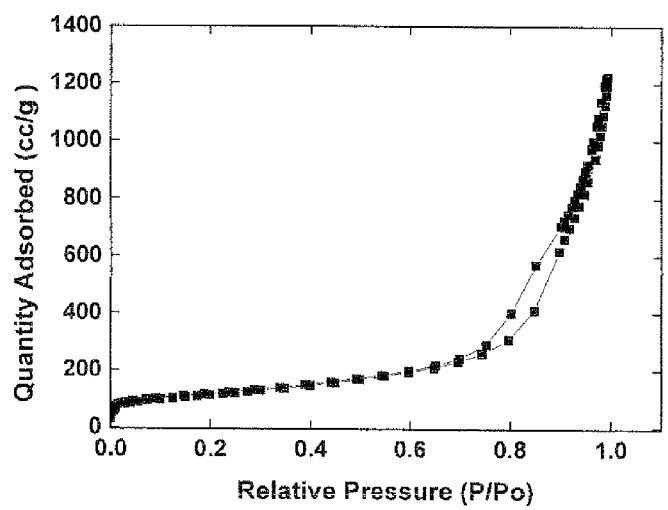
Figure 11:
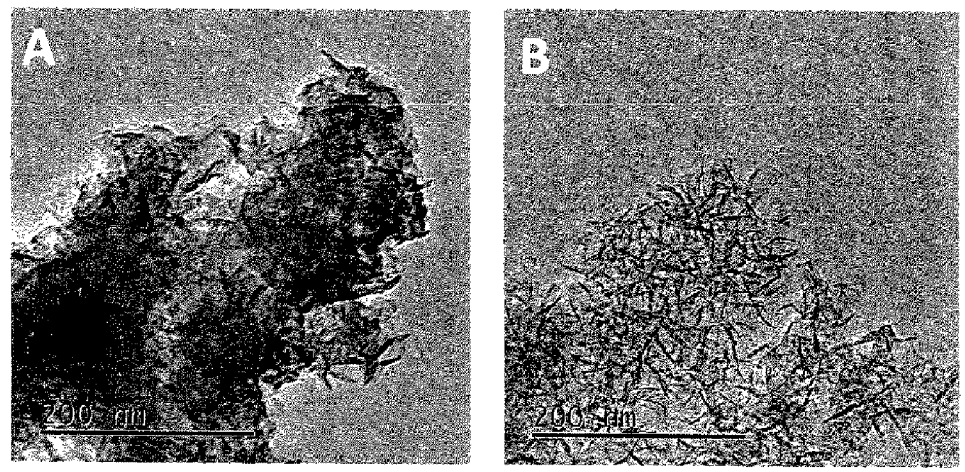
Figure 12:
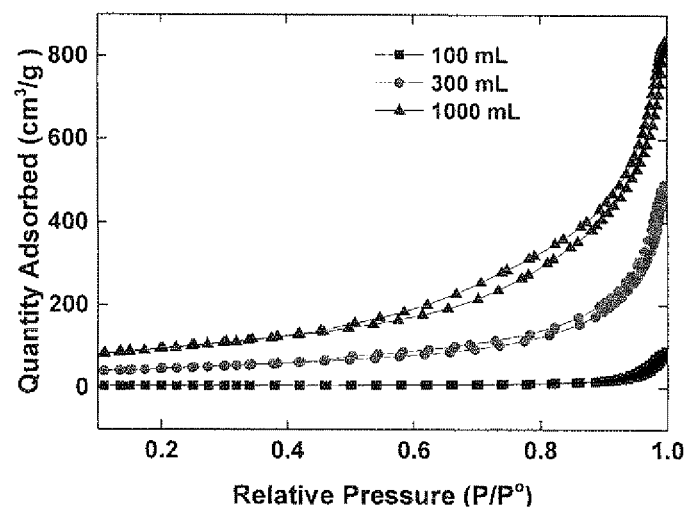

FIG. 4: SEM images of $Mg_3Al$—$CO_3$ LDHs obtained from Example 2 after drying by oven FIG. 5: SEM images of $Mg_3Al$—$CO_3$ LDHs obtained from Example 2 after spray drying FIG. 6: $N_2$-sorption isotherm of $Mg_3Al$—$CO_3$ LDHs obtained from Example 2 after drying by oven FIG. 7: $N_2$-sorption isotherm of $Mg_3Al$—$CO_3$ LDHs obtained from Example 2 after spray drying FIG. 8: SEM images of $Mg_3Al$—$CO_3$ LDHs obtained from Example 3 after drying by oven FIG. 9: SEM images of $Mg_3Al$—$CO_3$ LDHs obtained from Example 3 after spray drying FIG. 10: $N_2$-sorption isotherm of $Mg_3Al$—$SO_4$ LDHs obtained from Example 9 after drying in vacuum oven FIG. 11: TEM images of $Mg_3Al$—$CO_3$ LDHs obtained from Example 10 before drying (A) water washed (B) 1000 mL of rinsed acetone FIG. 12: $N_2$-sorption isotherm of $Mg_3Al$—$CO_3$ LDHs obtained from Example 10 rinsed with acetone of 100 mL, 300 mL and 1000 mL.

Figure 13:
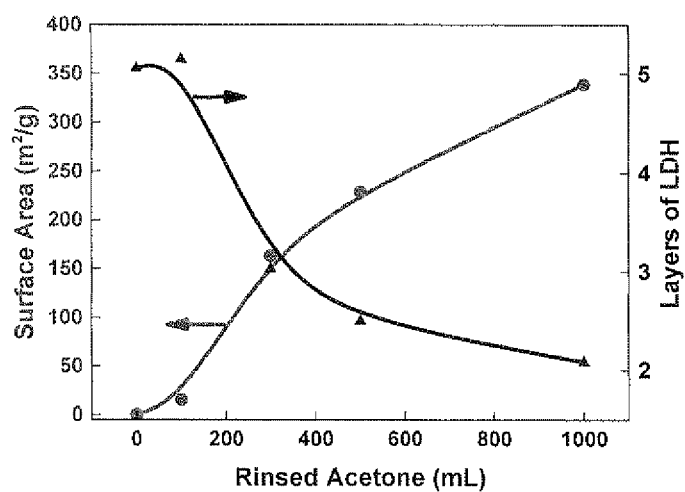

FIG. 13: BET surface area and LDH layers of of $Mg_3Al$—$CO_3$ LDHs obtained from Example 10 rinsed with different amount of acetone.

Figure 14:
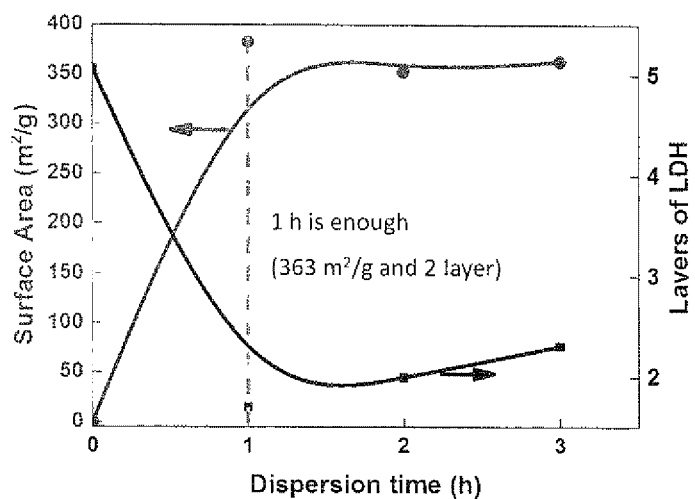

FIG. 14: BET surface area and LDH layers of of $Mg_3Al$—$CO_3$ LDHs obtained from Example 10 dispersed in acetone for different dispersion time.

Figure 15:
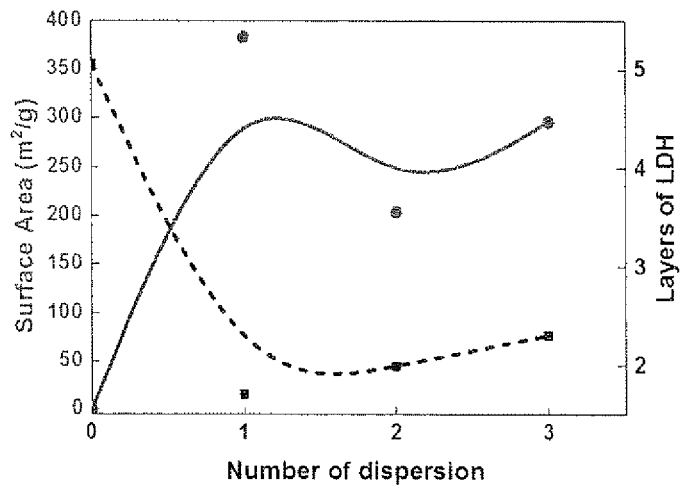

FIG. 15: BET surface area and LDH layers of of $Mg_3Al$—$CO_3$ LDHs obtained from Example 10 dispersed in acetone for different dispersion cycles.

Figure 16:
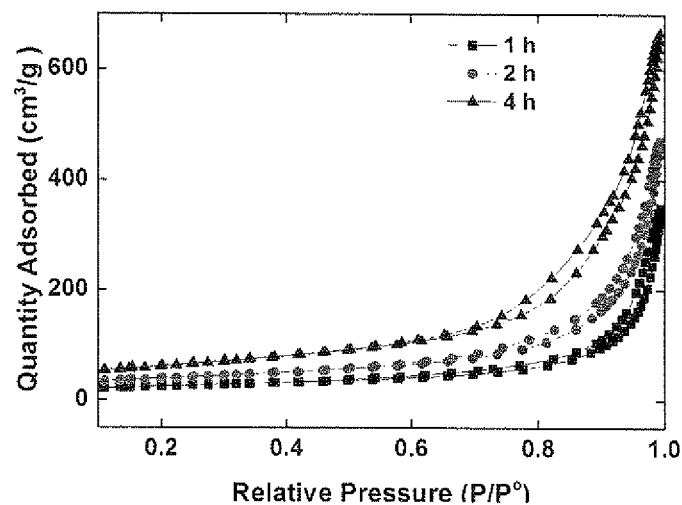

FIG. 16: $N_2$-sorption isotherm of $Mg_3Al$—$CO_3$ LDHs obtained from Example 11 dispersed in acetone for 1 h, 2 h and 4 h.

Figure 17:
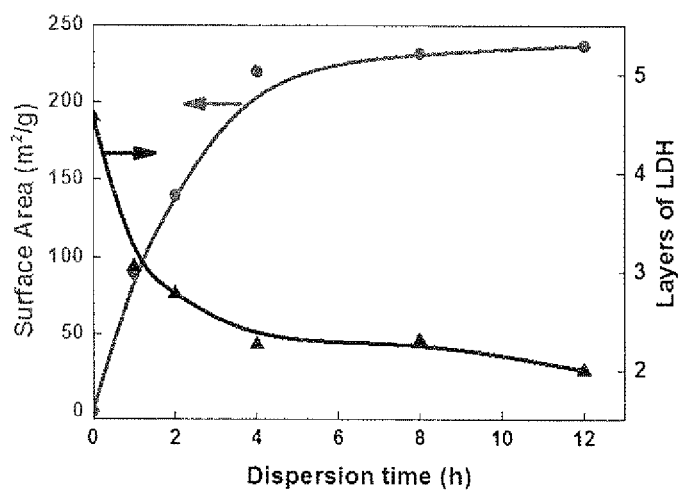

FIG. 17: BET surface area and LDH layers of of $Mg_3Al$—$CO_3$ LDHs obtained from Example 11 dispersed in acetone for different dispersion time.

Figure 18:
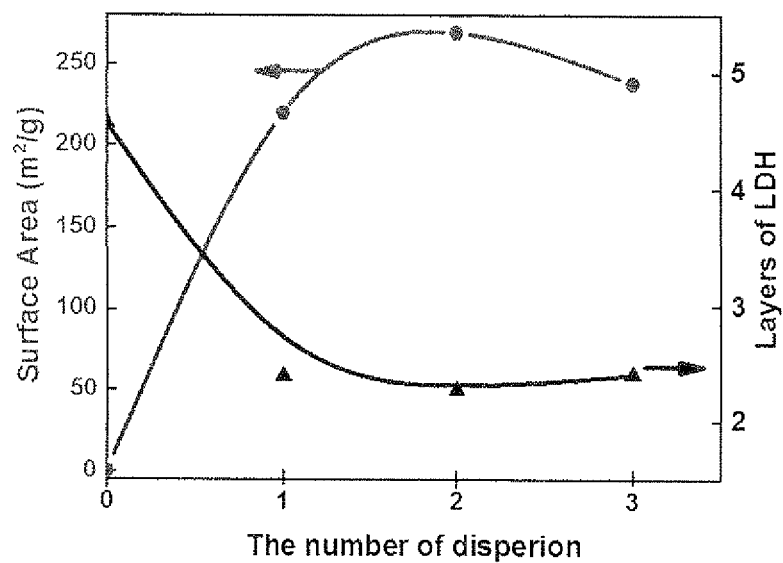

FIG. 18: BET surface area and LDH layers of of $Mg_3Al$—$CO_3$ LDHs obtained from Example 11 dispersed in acetone for different dispersion cycles.

EXAMPLES

Example 1

A metal precursor solution was prepared by dissolving 9.6 g of $Mg(NO_3)_2.6H_2O$ and 4.68 g of $Al(NO_3)_3.9H_2O$ in 50 mL deionized water. A base solution was prepared by dissolving 4 g of NaOH and 2.65 g of $Na_2CO_3$ in 200 mL of deionized water. The metal precursor solution was added quickly into base solution under visciously stirring. After 30 min, the resulting slurry was collected by filtration and washed thoroughly with water and acetone successively. The washed filter cake was re-dispersed into acetone (200 mL) with stirring at 60° C. After 48 h, the acetone in the suspension was removed and fresh acetone (200 mL) was introduced. The obtained new suspension was stirred at room temperature for 2 h. The suspension was filtered to collect the LDH solid which was then washed thoroughly with acetone. The final product $[Mg_{0.75}Al_{0.25}(OH)_2]$ $(CO_3)_{0.125}.0.4H_2O.0.1$ (acetone)=($Mg_3Al$—$CO_3$ LDH) was dried in an oven at 60° C. overnight.

Figure 3:
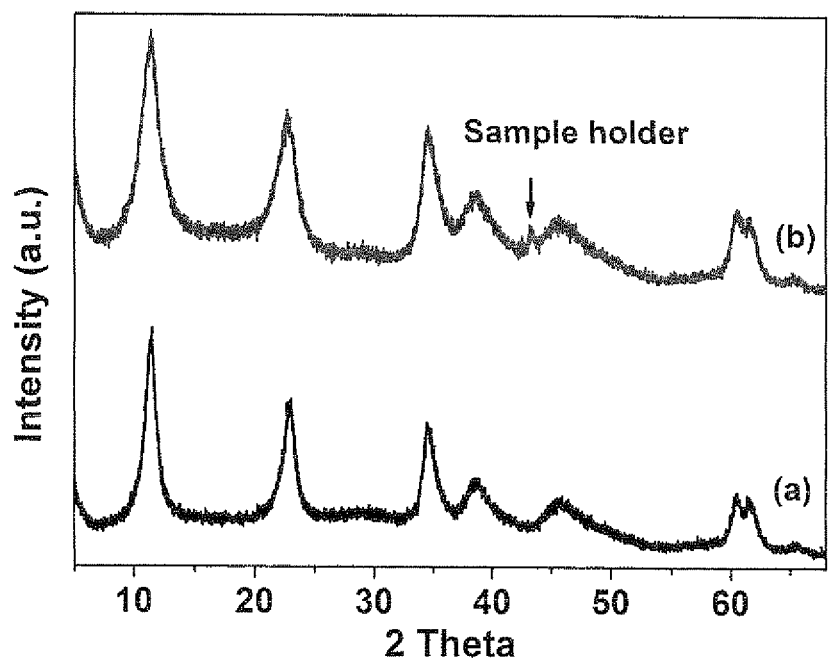

The BET surface area and pore volume of the resulting $Mg_3$_Al—$CO_3$ LDH are shown in Table 1. The morphology of the $Mg_3$—Al—$CO_3$ before drying is presented in FIG. 1. The morphology of the $Mg_3$—Al—$CO_3$ LDH after drying by spray dryer are presented in SEM images in FIG. 2. The purity of the obtained $Mg_3$—Al—$CO_3$ LDH was examined by X-Ray Diffraction as shown in FIG. 3.

TABLE 1

BET surface area and pore volume of $Mg_3$—Al—$CO_3$ LDHs obtained from Example 1.

| Drying Methods | Range of feed rate to spray dryer (mL/min) | BET surface area (m²/g) | Total pore volume (cc/g) |
|---|---|---|---|
| Oven, 65° C. (overnight) | — | 141 | 0.71 |
| Filter + vacuum | — | 180 | 0.92 |
| Spray dryer* | 20-25 | 248 | 1.99 |

*all the samples dried using spray dryer (the same as below) were conducted in the same conditions, which is using the same outlet temperature of 55° C.

Example 2

$[Mg_{0.75}Al_{0.25}(OH)_2](CO_3)_{0.125} \cdot 0.0.1H_2O \cdot 0.1(acetone) = Mg_3Al$—$CO_3$ LDH was synthesized by adding 200 mL $Mg(NO_3)_2 \cdot 6H_2O$ (0.15 mol) and $Al(NO_3)_3 \cdot 9H_2O$ (0.05 mol) solution drop-wise into a 200 ml $Na_2CO_3$ (0.10 mol) solution with a drop rate in the range of 0.1-3.5 {mol($M^{z+}+M^{y+}$)}/{mol(anion)*min}. The pH of the precipitation solution was controlled at 10 using a NaOH solution (4M), the resulting slurry was left for 16 hrs at room temperature. The obtained LDH slurry was filtered and washed with deionized water until a pH=7 was obtained and then the filtered solid was washed with acetone 500 ml through suction filter funnel. The "wet cake" was re-dispersed in 1000 ml acetone for 1 hr.

Half of the LDH produced, suspended in acetone, was dried by oven at 65° C. and the other half was dried by spray drying in a $N_2$ atmosphere. The BET surface area and pore volume of the resulting $[Mg_{0.75}Al_{0.25}(OH)_2](CO_3)_{0.125} \cdot 0.1H_2O \cdot 0.1(acetone) = (Mg_3Al$—$CO_3$ LDH) $Mg_3$—Al—$CO_3$ LDH are shown in Table 2. The morphology of $Mg_3$—Al—$CO_3$ LDH after drying by oven and spray dryer are comparatively presented in SEM images in FIGS. 4 and 5, respectively. $N_2$-sorption isotherm of $Mg_3Al$—$CO_3$ LDHs obtained after drying by oven and spray dryer were shown in FIGS. 6 and 7, respectively.

TABLE 2

BET surface area and pore volume of $Mg_3$—Al—$CO_3$ LDHs obtained from Example 2.

| Drying Methods | Range of feed rate to spray dryer (mL/min) | BET surface area (m²/g) | Total pore volume (cc/g) |
|---|---|---|---|
| Oven, 65° C. (overnight) | — | 154 | 0.88 |
| Spray dryer | 10-15 | 316 | 1.37 |
| Spray dryer | 15-20 | 330 | 1.36 |
| Spray dryer | 20-25 | 333 | 1.45 |
| Spray dryer | 25-30 | 314 | 1.19 |

Example 3

$[Mg_{0.75}Al_{0.25}(OH)_2](CO_3)_{0.125} \cdot 0.1H_2O \cdot 0.1$ (acetone)= $Mg_3Al$—$CO_3$ LDH was synthesized by adding 200 mL $Mg(NO_3)_2 \cdot 6H_2O$ (0.15 mol) and $Al(NO_3)_3 \cdot 9H_2O$ (0.05 mol) solution drop-wise into a 200 mL $Na_2CO_3$ (0.10 mol) solution with the drop rate in the range of 0.1-3.5 {mol ($M^{z+}+M^{y+}$)}/{mol(anion)*min}. The pH of the precipitation solution was controlled at lousing a NaOH solution (4 M). After 30 min. of ageing in original solution, the resulting slurry was filtered and washed with deionized water until a pH=7 was obtained. The filtered slurry was washed with acetone 500 mL through suction filter funnel followed by dispersion in 500 mL of acetone. After 16 hrs of stirring, the suspension was filtered and introduced fresh acetone (1000 mL) for another 1 hr of stirring. The half of LDH suspended in acetone was dried by oven at 65° C. and the other half was dried by spray drying in a $N_2$ atmosphere. The BET surface area and pore volume results of the resulting $Mg_3$—Al—$CO_3$ LDH are shown below in Table 3. The morphology of $Mg_3$—Al—$CO_3$ LDH after drying by oven and spray dryer are comparatively presented in SEM images in FIGS. 8 and 9, respectively.

TABLE 3

BET surface area and pore volume of $Mg_3$—Al—$CO_3$ LDHs obtained from Example 3.

| Drying Methods | Range of feed rate to spray dryer (mL/min) | BET surface area (m²/g) | Total pore volume (cc/g) |
|---|---|---|---|
| Oven, 65° C. (overnight) | — | 278 | 1.10 |
| Spray dryer | 25-30 | 326 | 1.25 |

Example 4

$[Ni_{0.075}Mg_{0.675}Al_{0.25}(OH)_2](CO_3)_{0.125} \cdot 0.42H_2O \cdot 0.13(acetone) = Ni_{0.3}Mg_{2.7}Al$—$CO_3$ LDH was synthesized by adding 700 mL $Ni(NO_3)_2 \cdot 6H_2O$ (0.0525 mol) and $Mg(NO_3)_2 \cdot 6H_2O$ (0.4725 mol) and $Al(NO_3)_3 \cdot 9H_2O$ (0.175 mol) solution drop-wise into a 700 ml $Na_2CO_3$ (0.35 mol) solution with a drop rate in the range of 0.1-3.5 {mol($M^{z+}+M^{y+}$)}/{mol(anion)*min}. The pH of the precipitation solution was controlled at 10 using a NaOH solution (4M), the resulting slurry was left for 16 hrs at room temperature. The obtained LDH slurry was filtered and washed with deionized water until a pH=7 was obtained and then the filtered solid was washed with acetone 3000 ml through suction filter funnel. The "wet cake" was re-dispersed in 1750 ml acetone for 1 hr.

Half of the LDH produced, suspended in acetone, was dried by oven at 65° C. and the other half was dried by spray drying in a $N_2$ atmosphere. The BET surface area and pore volume of the resulting $[Ni_{0.075}Mg_{0.675}Al_{0.25}(OH)_2](CO_3)_{0.125} \cdot 0.42H_2O \cdot 0.13(acetone) = (Ni_{0.3}Mg_{2.7}Al$—$CO_3$ LDH) $Ni_{0.3}$—$Mg_{2.7}$—Al—$CO_3$ LDH are shown in Table 4.

TABLE 4

BET surface area and pore volume of $Ni_{0.3}$—$Mg_{2.7}$—Al—$CO_3$ LDHs obtained from Example 4.

| Drying Methods | Range of feed rate to spray dryer (mL/min) | BET surface area (m²/g) | Total pore volume (cc/g) |
|---|---|---|---|
| Oven, 65° C. (overnight) | — | 177 | 0.65 |
| Spray dryer | 20-25 | 317 | 0.84 |

Example 5

$[Cu_{0.075}Mg_{0.675}Al_{0.25}(OH)_2](CO_3)_{0.125} \cdot 0.4H_2O \cdot 0.1(acetone) = Cu_{0.3}Mg_{2.7}Al$—$CO_3$ LDH was synthesized by adding 700 mL $Cu(NO_3)_2 \cdot 6H_2O$ (0.0525 mol) and $Mg(NO_3)_2 \cdot 6H_2O$ (0.4725 mol) and $Al(NO_3)_3 \cdot 9H_2O$ (0.175 mol)

solution drop-wise into a 700 ml $Na_2CO_3$ (0.35 mol) solution with a drop rate in the range of 0.1-3.5 {mol($M^{z+}$+$M^{y+}$)}/{mol(anion)*min}. The pH of the precipitation solution was controlled at 10 using a NaOH solution (4M), the resulting slurry was left for 16 hrs at room temperature. The obtained LDH slurry was filtered and washed with deionized water until a pH=7 was obtained and then the filtered solid was washed with acetone 3000 ml through suction filter funnel. The "wet cake" was re-dispersed in 1750 ml acetone for 1 hr.

The LDH produced, suspended in acetone, was dried by spray drying in a $N_2$ atmosphere. The BET surface area and pore volume of the resulting $[Cu_{0.075}Mg_{0.675}Al_{0.25}(OH)_2]$ $(CO_3)_{0.125}.0.4H_2O.0.1(acetone)=(Cu_{0.3}Mg_{2.7}Al—CO_3$ LDH) $Cu_{0.3}—Mg_{2.7}—Al—CO_3$ LDH are shown in Table 5.

TABLE 5

BET surface area and pore volume of $Cu_{0.3}$—$Mg_{2.7}$—Al—$CO_3$ LDHs obtained from Example 5.

| Drying Methods | Range of feed rate to spray dryer (mL/min) | BET surface area (m²/g) | Total pore volume (cc/g) |
|---|---|---|---|
| Spray dryer | 20-25 | 252 | 1.00 |

Example 6

$[Co_{0.075}Mg_{0.675}Al_{0.25}(OH)_2](CO_3)_{0.125}.0.4H_2O.0.1(acetone)=Co_{0.3}Mg_{2.7}Al—CO_3$ LDH was synthesized by adding 700 mL $Co(NO_3)_2.6H_2O$ (0.0525 mol) and Mg $(NO_3)_2.6H_2O$ (0.4725 mol) and $Al(NO_3)_3.9H_2O$ (0.175 mol) solution drop-wise into a 700 ml $Na_2CO_3$ (0.35 mol) solution with a drop rate in the range of 0.1-3.5 {mol($M^{z+}$+$M^{y+}$)}/{mol(anion)*min}. The pH of the precipitation solution was controlled at 10 using a NaOH solution (4M), the resulting slurry was left for 16 hrs at room temperature. The obtained LDH slurry was filtered and washed with deionized water until a pH=7 was obtained and then the filtered solid was washed with acetone 3000 ml through suction filter funnel. The "wet cake" was re-dispersed in 1750 ml acetone for 1 hr.

The LDH produced, suspended in acetone, was dried by spray drying in a $N_2$ atmosphere. The BET surface area and pore volume of the resulting $[Co_{0.075}Mg_{0.675}Al_{0.25}(OH)_2]$ $(CO_3)_{0.125}.0.4H_2O.0.1(acetone)=(Co_{0.3}Mg_{2.7}Al—CO_3$ LDH) $Co_{0.3}—Mg_{2.7}—Al—CO_3$ LDH are shown in Table 6.

TABLE 6

BET surface area and pore volume of $Co_{0.3}$—$Mg_{2.7}$—Al—$CO_3$ LDHs obtained from Example 6.

| Drying Methods | Range of feed rate to spray dryer (mL/min) | BET surface area (m²/g) | Total pore volume (cc/g) |
|---|---|---|---|
| Spray dryer | 20-25 | 256 | 1.06 |

Example 7

$[Cu_{0.0075}Ni_{0.0675}Mg_{0.675}Al_{0.25}(OH)_2]$ $(CO_3)_{0.125}.0.4H_2O.0.1(acetone)=Cu_{0.03}Ni_{0.27}Mg_{2.7}Al—CO_3$ LDH was synthesized by adding 700 mL Cu $(NO_3)_2.6H_2O$ (0.00525 mol) and $Ni(NO_3)_2.6H_2O$ (0.04725 mol) and $Mg(NO_3)_2.6H_2O$ (0.4725 mol) and Al $(NO_3)_3.9H_2O$ (0.175 mol) solution drop-wise into a 700 ml $Na_2CO_3$ (0.35 mol) solution with a drop rate in the range of 0.1-3.5 {mol($M^{z+}$+$M^{y+}$)}/{mol(anion)*min}. The pH of the precipitation solution was controlled at 10 using a NaOH solution (4M), the resulting slurry was left for 16 hrs at room temperature. The obtained LDH slurry was filtered and washed with deionized water until a pH=7 was obtained and then the filtered solid was washed with acetone 3000 ml through suction filter funnel. The "wet cake" was re-dispersed in 1750 ml acetone for 1 hr.

The LDH produced, suspended in acetone, was dried by spray drying in a $N_2$ atmosphere. The BET surface area and pore volume of the resulting $[Cu_{0.0075}Ni_{0.0675}Mg_{0.675}Al_{0.25}(OH)_2](CO_3)_{0.125}.0.4H_2O.0.1(acetone)=$ $(Cu_{0.03}Ni_{0.27}Mg_{2.7}Al—CO_3$ LDH) $Cu_{0.03}—Ni_{0.27}—Mg_{2.7}—Al—CO_3$ LDH are shown in Table 7.

TABLE 7

BET surface area and pore volume of $Cu_{0.03}$—$Ni_{0.27}$—$Mg_{2.7}$—Al—$CO_3$ LDHs obtained from Example 7.

| Drying Methods | Range of feed rate to spray dryer (mL/min) | BET surface area (m²/g) | Total pore volume (cc/g) |
|---|---|---|---|
| Spray dryer | 20-25 | 197 | 0.74 |

Example 8

$[Mg_{0.75}Al_{0.25}(OH)_2](NO_3)_{0.25}.0.32H_2O.0.12(acetone)=$ $Mg_3Al—NO_3$ LDH was synthesized by adding 700 mL $Mg(NO_3)_2.6H_2O$ (0.525 mol) and $Al(NO_3)_3.9H_2O$ (0.175 mol) solution drop-wise into a 700 ml $NaNO_3$ (0.35 mol) solution with a drop rate in the range of 0.1-3.5 {mol($M^{z+}$+$M^{y+}$)}/{mol(anion)*min}. The pH of the precipitation solution was controlled at 10 using a NaOH solution (4M), the resulting slurry was left for 16 hrs at room temperature. The obtained LDH slurry was filtered and washed with deionized water until a pH=7 was obtained and then the filtered solid was washed with acetone 3000 ml through suction filter funnel. The "wet cake" was re-dispersed in 1750 ml acetone for 1 hr.

The LDH produced, suspended in acetone, was dried by spray drying in a $N_2$ atmosphere. The BET surface area and pore volume of the resulting $[Mg_{0.75}Al_{0.25}(OH)_2]$ $(NO_3)_{0.25}.0.32H_2O.0.12(acetone)=(Mg_3Al—NO_3$ LDH) $Mg_3Al—NO_3$ LDH are shown in Table 8.

TABLE 8

BET surface area and pore volume of $Mg_3Al—NO_3$ LDHs obtained from Example 8.

| Drying Methods | Range of feed rate to spray dryer (mL/min) | BET surface area (m²/g) | Total pore volume (cc/g) |
|---|---|---|---|
| Spray dryer | 20-25 | 212 | 0.85 |

Example 9

$[Mg_{0.75}Al_{0.25}(OH)_2](SO_4)_{0.25}.0.55H_2O.0.13(acetone)=$ $Mg_3Al—SO_4$ LDH was synthesized by adding 20 mL $Mg(SO_4)_2$ (0.0375 mol) and $Al(SO_4)_3.16H_2O$ (0.0125 mol) solution quickly into a 50 ml solution containing 0.025 mol of $Na_2SO_4$ and 0.075 mol of NaOH. The resulting slurry was left for 30 min at room temperature. The obtained LDH slurry was filtered and washed with deionized water until a pH=7 was obtained and then the filtered solid was washed with acetone 500 mL through suction filter funnel. The "wet cake" was re-dispersed in 300 mL acetone for 2 hrs. The slurry was filtered and redispersed in 300 mL acetone for 2 hrs.

The LDH produced was filtrated and dried in vacuum oven for 16 hrs. The BET surface area and pore volume of the resulting [Mg$_{0.75}$Al$_{0.25}$(OH)$_2$](SO$_4$)$_{0.25}$.0.55H$_2$O.0.13(acetone)=(Mg$_3$Al—SO$_4$ LDH) Mg$_3$Al—SO$_4$ LDH are shown in Table 9. N$_2$-sorption isotherm of Mg$_3$Al—SO$_4$ LDHs after drying in vacuum oven can be shown in FIG. 10.

TABLE 9

BET surface area and pore volume of Mg$_3$Al—SO$_4$ LDHs obtained from Example 9.

| Drying Methods | Range of feed rate to spray dryer (mL/min) | BET surface area (m$^2$/g) | Total pore volume (cc/g) |
|---|---|---|---|
| Vacuum oven (Room temperature) | — | 180 | 0.93 |

Example 10

[Mg$_{0.75}$Al$_{0.25}$(OH)$_2$](CO$_3$)$_{0.25}$.0.1H$_2$O.0.1 (acetone)= Mg$_3$Al—CO$_3$ LDH was synthesized by adding the metal precursor solution (20 mL) of 1.875 M Mg(NO$_3$)$_2$.6H$_2$O and 0.625 M Al(NO$_3$)$_3$.9H$_2$O into the 50 mL of 0.5 M Na$_2$CO$_3$ solution with a drop rate in the range of 0.1-3.5 mol {mol(M$^{z+}$+M$^{p+}$)}/{mol(anion)*min}. The pH value was kept at ca. 10.0 by dropwise addition of a 4.0 M NaOH solution. After 30 min with stirring at room temperature, the slurry was washed with DI water until the pH was close to 7 following by being rinsed with certain amount of acetone (step 1: rinsed acetone). The obtained LDH wet cake was dispersed in acetone (300 mL) and stirred at room temperature for certain time (step 2: dispersion time). Then the LDH was filtered and re-dispersed into flesh acetone (300 mL) for dispersion cycle study (step 3: dispersion cycle) or dried in vacuum oven for 16 hrs. The BET surface area and pore volume of the resulting Mg$_3$Al—CO$_3$ LDH in each step are shown in Tables 10-12. The morphology of wet Mg$_3$—Al—CO$_3$ LDH after water washing and 1000 mL of rinsed acetone are comparatively presented in TEM images in FIG. 11. N$_2$-sorption isotherm of Mg$_3$Al—CO$_3$ LDHs obtained after rinsing with different volumes of acetone were shown in FIG. 12. The surface area and LDH layers of Mg$_3$Al—CO$_3$ LDHs after each step were shown in FIG. 13-15.

TABLE 10

BET surface area and pore volume of Mg$_3$Al—CO$_3$ LDHs obtained from Step 1 (Rinsed acetone) in Example 10.

| Drying Methods | Rinsed acetone (mL) | BET surface area (m$^2$/g) | Total pore volume (cc/g) |
|---|---|---|---|
| Vacuum oven (Room temperature) | 0 | 0.07 | 0.002 |
| | 300 | 163 | 0.79 |
| | 500 | 229 | 0.79 |
| | 1000 | 339 | 1.34 |

TABLE 11

BET surface area and pore volume of Mg$_3$Al—CO$_3$ LDHs obtained from Step 2 (Dispersion time) in Example 10 (Rinsed acetone: 500 mL).

| Drying Methods | Dispersion time (h) | BET surface area (m$^2$/g) | Total pore volume (cc/g) |
|---|---|---|---|
| Vacuum oven (Room temperature) | 0 | 0.07 | 0.002 |
| | 1 | 363 | 1.18 |
| | 2 | 352 | 1.25 |
| | 3 | 364 | 1.17 |

TABLE 12

BET surface area and pore volume of Mg$_3$Al—CO$_3$ LDHs obtained from Step 3 (Dispersion cycle) in Example 10 (Rinsed acetone: 500 mL, dispersion time: 1 h, 300 mL).

| Drying Methods | Dispersion cycle | BET surface area (m$^2$/g) | Total pore volume (cc/g) |
|---|---|---|---|
| Vacuum oven (Room temperature) | 0 | 0.07 | 0.002 |
| | 1 | 363 | 1.18 |
| | 2 | 204 | 0.93 |
| | 3 | 269 | 1.13 |

Example 11

[Mg$_{0.75}$Al$_{0.25}$(OH)$_2$](CO$_3$)$_{0.25}$.0.4H$_2$O.0.1(acetone) Mg$_3$Al—CO$_3$ LDH was synthesized by adding the metal precursor solution (20 mL) of 1.875 M Mg(NO$_3$)$_2$.6H$_2$O and 0.625 M Al(NO$_3$)$_3$.9H$_2$O quickly into the 50 mL of 0.5 M Na$_2$CO$_3$ solution. The pH value was kept at ca. 10.0 by dropwise addition of a 4.0 M NaOH solution. After 30 min with stirring at room temperature, the slurry was washed with DI water until the pH was close to 7 following by being rinsed with certain amount of acetone (step 1: rinsed acetone). The obtained LDH wet cake was dispersed in acetone (300 mL) and stirred at room temperature for certain time (step 2: dispersion time). Then the LDH was filtered and re-dispersed into flesh acetone (300 mL) for dispersion cycle study (step 3: dispersion cycle) or dried in vacuum oven for 16 hrs.

The BET surface area and pore volume of the resulting Mg$_3$Al—CO$_3$ LDH in each step are shown in Table 13-14. N$_2$-sorption isotherm of Mg$_3$Al—CO$_3$ LDHs obtained after rinsing with different dispersion time of acetone were shown in FIG. 16. The surface area and LDH layers of Mg$_3$Al—CO$_3$ LDHs after Step 2 and Step 3 were shown in FIG. 17-18.

TABLE 13

BET surface area and pore volume of Mg$_3$Al—CO$_3$ LDHs obtained from Step 2 (Dispersion time) in Example 11 (Rinsed acetone: 500 mL).

| Drying Methods | Dispersion time (h) | BET surface area (m$^2$/g) | Total pore volume (cc/g) |
|---|---|---|---|
| Vacuum oven (Room temperature) | 0 | 0.08 | 0.00 |
| | 1 | 90 | 0.55 |
| | 2 | 140 | 0.75 |
| | 4 | 220 | 1.07 |
| | 12 | 232 | 0.86 |

TABLE 14

BET surface area and pore volume of Mg$_3$Al—CO$_3$ LDHs obtained from Step 3 (Dispersion cycle) in Example 11 (Rinsed acetone: 500 mL, dispersion time: 1 h, 300 mL).

| Drying Methods | Dispersion cycle | BET surface area (m$^2$/g) | Total pore volume (cc/g) |
| --- | --- | --- | --- |
| Vacuum oven (Room temperature) | 0 | 0.08 | 0.00 |
| | 1 | 220 | 1.07 |
| | 2 | 269 | 0.93 |
| | 3 | 238 | 1.13 |

The invention claimed is:

1. A method of preparing a layered double hydroxide having a specific surface area of at least 125 m$^2$/g and having the formula:

$$[M^{z+}_{1+x}M'^{y+}_{x}(OH)_2]^{a+}(X^{n-})_{a/n} \cdot bH_2O \cdot c(\text{AMO-solvent}) \quad (I)$$

wherein M and M' are different and each is a charged metal cation (and must be present),
z=1 or 2;
y=3 or 4,
0<x<0.9,
b is 0 to 10,
0<c≤10,
X is an anion selected from at least one of halide, inorganic oxyanion, anionic surfactants, anionic chromophores, and anionic UV absorbers, wherein the inorganic oxyanion is selected from carbonate, bicarbonate, hydrogenphosphate, dihydrogenphosphate, nitrite, nitrate, sulphate or phosphate or a mixture of two or more thereof,
n is the charge on the anion,
a=z(1−x)+xy−2; and
AMO-solvent is an aqueous miscible organic solvent having a solvent polarity (P) in the range 3.8 to 9,
which method comprises
a) precipitating a layered double hydroxide having the formula $$[M^{z+}_{1-x}M'^{y+}_{x}(OH)_2]^{a+}(X^{n-})_{a/n} \cdot bH_2O$$

wherein M, M', z, y, x, a, b and X are as defined above from a solution containing the cations of the metals M and M' and the anion $X^{n-}$;
b) ageing the layered double hydroxide precipitate obtained in step a) in the original solution;
c) collecting the layered double hydroxide precipitate by filtration, then washing the layered double hydroxide precipitate until the washing solution has a pH which is substantially neutral;
d) dispersing the wet layered double hydroxide precipitate in an AMO-solvent so as to produce a slurry of the layered double hydroxide in the solvent, wherein the AMO-solvent is an aqueous miscible organic solvent having a solvent polarity (P) in the range 3.8 to 9;
e) maintaining the dispersion obtained in step d); and
f) recovering and drying the layered double hydroxide.

2. A method according to claim 1, wherein, in formula (I), when z is 2, M is Mg, Zn, Fe, Ca, Sn Ni, Cu, Co, Mn or Cd or a mixture of two or more of these, or when z is 1, M is Li.

3. A method according to claim 1, wherein in step a) the layered double hydroxide precipitate is formed by introducing metal ($M^{z+}+M'^{y+}$) solution to the anion ($X^{n-}$) solution with a drop rate in the range of 0.1 to 3.5{mol($M^{z+}+M'^{y+}$)}/{mol(anion)*min}.

4. A method according to claim 1, wherein in step a) the layered double hydroxide is precipitated from the cation and anion containing solution which either additionally contains NaOH or to which NaOH solution is added separately to adjust pH of solution to a predetermined value.

5. A method according to claim 1, wherein in step b) the layered double hydroxide precipitate is aged in the original solution for less than 24 hours.

6. A method according to claim 1, wherein in step c) the washed layered double hydroxide precipitate is then rinsed with AMO-solvent.

7. A method according to claim 1, wherein in step d) the wet layered double hydroxide obtained in step c) is dispersed and maintained in AMO-solvent under stirring.

8. A method according to claim 1, wherein in step e) the dispersion obtained in step d) is maintained for up to 96 hours.

9. A method according to claim 1, wherein after step e) the layered double hydroxide is collected as wet form and is dispersed in a fresh volume of the AMO solvent and the dispersion is maintained for at least two hours.

10. A method according to claim 1, wherein in step f), the layered double hydroxide is recovered by filtration and the recovered layered double hydroxide is dried in an oven or by a spray dryer.

11. A method according to claim 1, wherein, in formula (I), when y is 3, M' is Al, Ga, Y, In, Fe, Co, Ni, Mn, Cr, Ti, V, or La, or when y is 4, M' is Sn, Ti or Zr or a mixture thereof.

12. A method according to claim 11, wherein M' is Al.

13. A method according to claim 12, wherein the layered double hydroxide is selected from Zn/Al, Mg/Al, Ca/Al, Ni/Al, and Cu/Al.

14. A method according to claim 13, wherein the layered double hydroxide is an Mg/Al layered double hydroxide.

15. A layered double hydroxide having a specific surface area of at least 125 m$^2$/g, a BET pore volume (N$_2$) of at least 0.5 cc/g and having the formula:

$$[M^{z+}_{1-x}M'^{y+}_{x}(OH)_2]^{a+}(X^{n+})_{a/n} \cdot bH_2O \cdot c(\text{AMO-solvent}) \quad (I)$$

wherein M and M' are different and each is a charged metal cation (and must be present),
z=1 or 2;
y=3 or 4,
0<x<0.9,
b is 0 to 10,
0<c≤10,
X is an anion selected from at least one of halide, inorganic oxyanion, anionic surfactants, anionic chromophores, and anionic UV absorbers, wherein the inorganic oxyanion is selected from carbonate, bicarbonate, hydrogenphosphate, dihydrogenphosphate, nitrite, nitrate, sulphate or phosphate or a mixture of two or more thereof,
n is the charge on the anion,
a=z(1−x)+xy−2; and
AMO-solvent is an aqueous miscible organic solvent having a solvent polarity (P) in the range 3.8 to 9.

16. A layered double hydroxide according to claim 15, wherein the layered double hydroxide has a specific surface area of at least 240 m$^2$/g.

17. A layered double hydroxide according to claim 15, wherein the layered double hydroxide has a BET pore volume (N$_2$) of at least 1.0 cc/g.

18. A layered double hydroxide according to claim 15, wherein the layered double hydroxide is dried by spray drying and has an agglomerated particle size less than 30 μm.

19. A layered double hydroxide according to claim 15, wherein the layered double hydroxide has a particle size less than 150 μm.

20. A layered double hydroxide according to claim 19, wherein the layered double hydroxide has a particle size less than 30 μm.

* * * * *

UNITED STATES PATENT AND TRADEMARK OFFICE
CERTIFICATE OF CORRECTION

PATENT NO. : 10,040,695 B2
APPLICATION NO. : 15/129137
DATED : August 7, 2018
INVENTOR(S) : Dermot O'Hare et al.

Page 1 of 1

It is certified that error appears in the above-identified patent and that said Letters Patent is hereby corrected as shown below:

In Claim 15 (at Column 14, Line number 42), the formula:
"$[M^{z+}_{1-x}M'^{y+}_{x}(OH)_2]^{a+}(X^{n+})_{a/n}{}^{+}bH_2O \cdot c(\text{AMO-solvent})$     (I)"
Should appear as:
--$[M^{z+}_{1-x}M'^{y+}_{x}(OH)_2]^{a+}(X^{n-})_{a/n}{}^{+}bH_2O \cdot c(\text{AMO-solvent})$     (I)--

Signed and Sealed this
Ninth Day of October, 2018

Andrei Iancu
*Director of the United States Patent and Trademark Office*